United States Patent [19]
Laniado et al.

[11] Patent Number: 5,443,923
[45] Date of Patent: Aug. 22, 1995

[54] PAPER/PLASTIC COMPOSITE SHEET AND METHOD OF MANUFACTURING

[75] Inventors: Josephe Laniado; Moshe Har-El, both of Jerusalem, Israel

[73] Assignee: Roll-Screens, Inc., Hockessin, Del.

[21] Appl. No.: 960,788

[22] Filed: Oct. 14, 1992

Related U.S. Application Data

[60] Division of Ser. No. 645,765, Jan. 25, 1991, Pat. No. 5,176,774, which is a continuation of Ser. No. 269,176, Nov. 9, 1988, abandoned, which is a continuation-in-part of Ser. No. 4,342, Jan. 16, 1987, Pat. No. 4,848,437.

[30] Foreign Application Priority Data

Jan. 24, 1986 [IL] Israel ............................ 77697

[51] Int. Cl.6 .............................................. B41M 3/12
[52] U.S. Cl. .................. 428/476.1; 296/97.1; 296/97.2; 296/97.8; 296/98; 156/229; 160/237; 160/374.1; 160/370 A; 160/120; 428/906
[58] Field of Search ............... 156/229; 428/411.1, 428/476.1, 906; 160/237, 374, 368.5, 120, 122, 238, 237, 374.1, 120, 370.2; 296/97 R, 97 G, 97 J, 95 Q, 95 C

[56] References Cited

U.S. PATENT DOCUMENTS

| | | |
|---|---|---|
| 2,490,946 | 12/1949 | Cloud . |
| 2,826,523 | 3/1958 | Blaszkowski et al. . |
| 3,236,290 | 2/1966 | Lueder . |
| 3,620,896 | 11/1971 | Glasgow . |
| 3,806,387 | 4/1974 | Peetz et al. . |
| 4,202,396 | 5/1980 | Levy ................................. 168/107 |
| 4,433,711 | 2/1984 | Lew .................................. 168/120 |
| 4,615,922 | 10/1986 | Newsome et al. ................ 192/53 |
| 4,671,558 | 6/1987 | Cline ................................ 296/97 |
| 5,176,774 | 1/1993 | Laniado et al. . |

FOREIGN PATENT DOCUMENTS 1955584 5/1971 Germany .
1091588 11/1967 United Kingdom .

Primary Examiner—Patrick J. Ryan
Assistant Examiner—Merrick Dixon
Attorney, Agent, or Firm—Ratner & Prestia

[57] ABSTRACT

The invention provides a multilayer plastic sheet of self-rollable material comprising at least two layers of material joined to one another at states of different relative stretch and capable of alternating between a relaxed and a tensioned state and of inherently assuming a rolled-up configuration in said relaxed state as a result of the different states of stretch of the respective layers and to retain said inherent property of spontaneous rolling up even after prolonged exposure to sunlight and heat. The invention also provides a process for preparing a rollable sheet containing at least one layer of laminatable plastic material, said sheet being capable of alternating between a relaxed and a tensioned state and of inherently assuming a rolled up configuration in said relaxed state and retaining said inherent property of spontaneous rolling up even after prolonged exposure to sunlight and heat, said process comprising heating and stretching a first sheet of plastic material and laminating said first sheet of prestretched plastic material to a second sheet of non-stretched material, to form a self-rollable composite sheet.

14 Claims, 1 Drawing Sheet

PAPER/PLASTIC COMPOSITE SHEET AND METHOD OF MANUFACTURING

This application is a division of U.S. application Ser. No. 07/645,765 filed on Jan. 25, 1991, now U.S. Pat. No. 5,176,774, which is a continuation of U.S. application Ser. No. 07/269,176, filed on Nov. 9, 1988, now abandoned, which is a continuation-in-part of U.S. application Ser. No. 07/004, 342 filed on Jan. 16, 1987, now U.S. Pat. No. 4,848,437 issued on Jul. 18, 1989.

The present invention relates to a multilayer plastic sheet of rollable material and to a process for the preparation thereof. More particularly the present invention relates to a sunshade or sunblind adapted for attachment across a vehicle window surface for protecting the interior of a motor-vehicle against sun rays and glare, to specially prepared sheet materials for use therein and to processes for the preparation of these sheets.

As described in U.S. Pat. No. 4,202,396 the state of the art of sunshades for motorcars before said patents generally fell into two main categories: Outdoor and indoor. The outdoor devices were comprised of an arcuate semi-transparent member mounted above the upper portion of the front window. These devices filter and shade part of the interior of a car only when the sun is at the higher part of its orbit.

The indoor means were either curtains or venetian blinds which were permanently affixed to the side or rear window frames. Alternatively, for the protection of front window, plain flat sheets of any rigid material were used which were dimensioned so that they could be placed on the dashboard cover.

U.S. Pat. No. 4,202,396, however, changed the state of the art by providing foldable sunblind for motor-car windows characterised by a self-contained unit adapted to assume either a stretched position, forming a substantially continuous partition detachably mountable at the inner side of said windows, or a collapsed position, forming a box-like package. Said unit comprised a series of planar rectangular board elements foldably joined to each other along their longitudinal edges. At least two flaps were integrally provided with two spaced elements adapting the said partitions to be appended from a fitting of the motorcar.

Said sunblinds are today by far the most popular and widely sold of the various types now on the market. However, they suffer from several major disadvantages.

Firstly, the folding and unfolding process is tedious due to the fact that the sunshade with its rigid joined panels is cumbersome, since each panel measures about 60 cm×13 cm and each shade contains about ten such panels.

Secondly, even in its folded state, said sunshade occupies substantial space on the floor of a car when not in use and is constantly getting under foot and in the way. Moreover, the folded blind is to be held together by a rubber band which is frequently easily lost.

For several years there has also been available on the market a sunblind formed of a sheet of thin rollable plastic laminated with a thin sheet of aluminum foil and provided at its ends with means for attachment across a car window surface as described e.g. in German Offenlegungshchrifft 1955584.

While such a shade is much more compact in its rolled state than the box-like package of joined rectangular panels, the rolling and unrolling thereof is also time-consuming and annoying or else is based on the attachment of one end of said sheet to an expensive steel coil spring mechanism.

With this state of the art in mind and especially in light of the widespread need for sunshades which would protect the interiors of motor vehicles from the sun's heat and harmful bleaching rays and the aforementioned dissatisfaction with the disadvantages of the presently marketed products, there is now provided a process for preparing a new type of sunblind which ameliorates the above problems and provides a much more convenient and easy to use and store sunblind than those that have been heretofore available.

Thus according to the present invention there is now provided a process for preparing a self-rollable sheet containing at least one layer of laminatable plastic material said sheet being capable of alternating between a relaxed and a tensioned state and of inherently assuming a rolled up configuration in said relaxed state and retaining said inherent property of spontaneous rolling up even after prolonged exposure to sunlight and heat, said process comprising heating and stretching a first sheet of plastic material and laminating said first sheet of prestretched plastic material to a second sheet of non-stretched material, to form a self-rolling composite sheet.

The invention also provides a multilayer plastic sheet of self-rollable material comprising at least two layers of material joined to one another at states of different relative stretch and capable of alternating between a relaxed and a tensioned state and of inherently assuming a rolled-up configuration in said relaxed state as a result of the different states of stretch of the respective layers and to retain said inherent property of spontaneous rolling up even after prolonged exposure to sunlight and heat.

In its preferred embodiments the present invention provides a sun blind for protecting the interior of a motor vehicle against sun rays and glare comprising a multi-layer plastic sheet of self-rollable material comprising at least two layers of material joined to one another at states of different relative stretch, said sheet being capable of alternating between a relaxed and a tensioned state and of inherently assuming a rolled-up configuration around an axis in said relaxed state as a result of the different states of stretch of the layers, and to retain said inherent property of spontaneous rolling up even after prolonged exposure to sunlight and the heat generated in the interior of a closed motor vehicle exposed to sunlight, said blind containing material interfering with at least a substantial portion of solar radiation impinging thereon in said tensioned unrolled state, and, said blind further comprising means for attachment of the ends thereof across a window surface wherein upon release of at least one of the ends of said sheet, said sheet will spontaneously roll up upon itself as a result of the different states of stretch of the respective layers.

Preferably said layer is a plastic material selected from polyethylene, polyethylene terephthalate, polypropylene, mylar (Dupont), generally defining polyester, and nylon.

As will be realized after studying the examples hereinafter, the self-rolling multilayer sheets of the present invention can be prepared in different ways-applying the principles of manufacture taught herein.

In general a first sheet of laminatable plastic material is passed over a first glue applying set of rollers of a laminating machine and passed through the oven thereof at a temperature which can vary e.g. between 100° C. and 200° C. and at a speed which can vary e.g. between about 80 m/min to about 120 m/min depending on the plastic used, the length of the oven and the relationship retained between the speed and temperature.

The speed of the take-up laminating rollers and the feed glue applying rollers are adjusted relative to each other to create a stretch of the sheet in the oven of about 4 to 15%.

The stretched sheet is then laminated to a relatively non-stretched second sheet of material and due to the different states of stretch of the respective layers, the formed composite sheet will spontaneously roll,up upon itself.

To augment this self-rolling effect and to cause a tightening of the roll the composite sheet is irridated, heated and/or exposed to moisture to effect a softening of said second sheet and/or a cross-linking of the material therein.

In preferred multilayer sunblind said sheet can alternatively be made of a layer of polyethylene terephthalate joined to a layer of nylon or of polypropylene joined to nylon which materials are laminated under different states of stretch.

Alternatively, said multilayer sheet preferably comprises two layers of polyethylene terephthalate joined to each other while in different states of relative stretch.

In U.S. Pat. No. 2,826,523 there is described a self-rolling tarpaulin or covering made of laminated layers of rubber bonded with a bonding agent or by vulcanization however said covering could not be used as a sunblind for a motor vehicle since it is not sufficiently heat resistant to withstand the heat generated in the interior of a closed motor vehicle exposed to sunlight which heat is known, by black box experiments, to reach as much as 75° C.

Preferably said sheets also comprise a layer of reflecting material for reflecting at least part of the solar radiation impinging therein and especially preferred is a pretensioned, inherently self-rolling sheet according to the present invention having a layer of reflective aluminum incorporated therein.

Said multilayered sheet can also be prepared using a layer of nylon, polyethylene terephthalate or polypropylene which can be tensioned and then attached to a layer of another material such as heavy duty paper or aluminum foil.

While the sunblinds according to the present invention can be made to roll up around a fixed rigid support provided at one or at both of its ends in a scroll like fashion, in preferred embodiments of the present invention said blind will roll up around an axis established at some midpoint between its edges as described and explained more fully hereinafter.

Thus in one preferred embodiment of the present invention there is provided a self-rolling sunblind according to the present invention comprising two sheets concentrically and substantially coextensively interrolled with one edge of a first sheet joined to an aligned edge of a second sheet, said joined edges serving substantially as the axis around which said blind rolls up in said relaxed state, the respective unjoined ends of said sheets being provided with means for attachment across a window surface.

In especially preferred embodiments of the present invention the self-rolling property of the sheets themselves is utilized to eliminate the need for a separate rigid support for each of the unjoined ends of said sheets, each of said ends being rolled tightly about itself to form a substantially rigid column to which is affixed attachment means provided e.g. with eyelets for attachment to hooks affixed e.g. by suction cups to both ends of the window to be covered.

The present invention also provides such a sunblind whenever in combination with a window of a motor vehicle.

Alternatively there is provided a self rolling sunblind according to the present invention wherein said sheet is provided with a fold line across one of the axis thereof, said fold line dividing said sheet into two concentrically and substantially coextensively interrolled portions, said fold line serving substantially as the axis around which said blind portions roll up in said relaxed state.

As will be realized, the self-rolling sheets of the present invention can be used not only for sun blinds but also for the preparation of awnings, shades and even tents wherein the inherent property of spontaneous rolling up even after prolonged exposure to sunlight and heat as well as the property of ready compact storage are advantageous.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles-and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
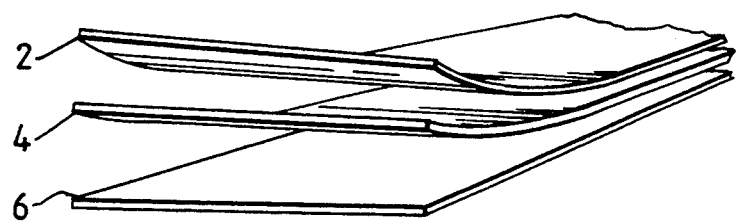
FIG. 1 is a schematic representation of a three layered pretensioned laminar sheet from which a preferred blind of the present invention is formed.

In FIG. 1 there is schematically shown a portion of a sunblind according to the present invention in its tensioned unrolled configuration. This blind is composed of a first sheet of medium density polyethylene 2 laminated to a second sheet of aluminum foil 4 which is in turn laminated to a third stretched sheet of medium density polyethylene 6 (see example 1 hereinafter). As explained hereinbefore, due to the different states of stretch of the respective layers the blind will inherently and spontaneously roll up upon itself when not secured in a tensioned unrolled configuration.

Figure 2:
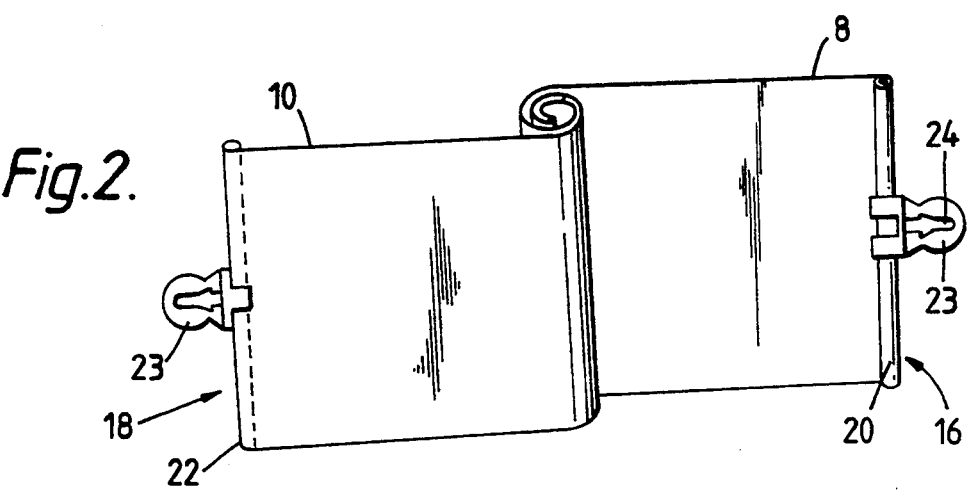
FIG. 2 is a schematic perspective view of a sunblind in its unrolled state.
Figure 3:
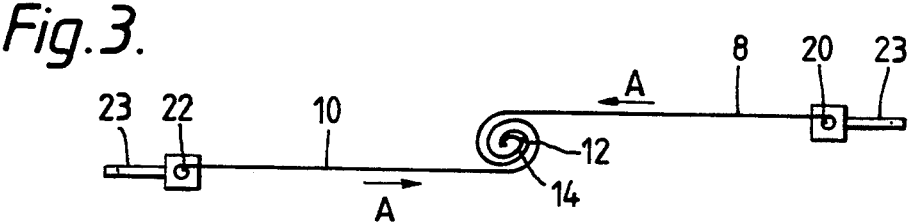
FIG. 3 is a cross-sectional view of FIG. 2.

In FIGS. 2 and 3 there is schematically shown an especially preferred embodiment of the present invention in which two pretensioned sunblind sheets 8, 10 according to the present invention are joined together by the welding of one edge 12 of a first sheet 8 to an aligned edge 14 of the second sheet 10 in an arrangement whereby due to the internal tension of each sheet they will concentrically roll around each other, with said joined edges 12 and 14 serving substantially as the axis around which said blind rolls-up in its relaxed state.

The two unjoined ends 16, 18 of said sheets are each rolled about themselves to form a coreless substantially rigid column 20, 22 to which are affixed attachment means 23 provided with apertures 24 releasably attachable to hooks (not shown) affixed to both ends of the window to be covered.

The thus prepared blind when released spontaneously rolls up upon itself in the direction of arrows A as a result of the different states of stretching of the pretensioned sheets of the present invention.

It will be realized that instead of joining edges 12 and 14 of two separate sheets 8 and 10 as shown, the same effect can be achieved by using a press to form a permanent fold line in a single sheet at the area where edges 12 and 14 are shown as joined in FIG. 3.

Figure 4:
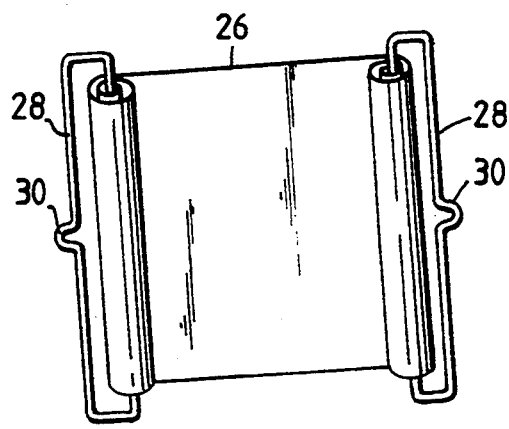
FIG. 4 is a further embodiment of a blind according to the invention partly rolled up on both of its lateral sides.

In FIG. 4, there is illustrated another embodiment of the present invention in which a pretensioned sunblind sheet 26 according to the present invention is attached at both of its ends to a bow-like holder 28. Said holders are provided with eyelets 30 for attachment to hooks (not shown) affixed to both ends of the window to be covered.

Figure 5:
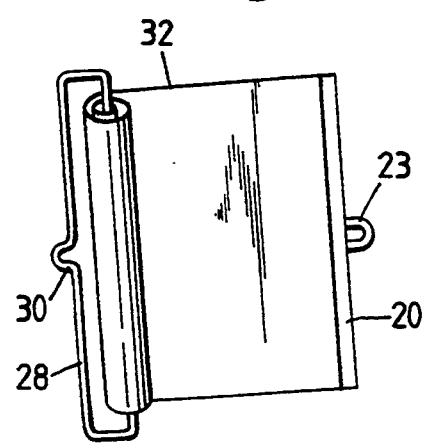
FIG. 5 is another embodiment of a blind according to the invention partly rolled up at one of its lateral sides.

Similarly, in FIG. 5 there is illustrated a pretensioned sun blind sheet 32 which rolls up around a single bow-like holder 28, the free end of which is rolled upon itself to form a coreless substantially rigid column to which is affixed attachment means 23 provided with an aperture 24 and attachable as described with reference to FIGS. 2–4.

As will be realized, embodiment of FIGS. 2 and 3 is especially preferred since said first preferred embodiment requires no parts except for the sheet itself and attachment clips 23 as the sheet itself acts as its own axis and its own rigidifying end strip.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims, Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of preparation procedures as well as of the principles and conceptual aspects of the invention.

EXAMPLE 1

A sheet of medium density polyethylene 50 microns thick, is glued to a sheet of 12 microns thick aluminum foil in a laminating machine (Faustel, Butler Wisc.) to form a first composite sheet.

A second sheet of polyethylene, 25 microns thick, is stretched 10% in an oven at 125° C. and then glued to the aluminum foil side of said first composite sheet in said laminating machine to form a second composite sheet.

Said second composite sheet is rolled on a spool and cured at room temperature for 48 hours with the second sheet of polyethylene material on the inside.

After curing, the sheet is cut into smaller sheets measuring 45 by 60 cm, two such smaller sheets are superposed and one edge of a first sheet is heat welded to an aligned edge of a second sheet.

The joined sheets spontaneously concentrically roll up upon themselves with said welded end serving substantially as the axis around which said sheets roll up.

In order to assure that this inherent property of spontaneous rolling up is retained even after prolonged exposure to sunlight and heat the rolled up blind is introduced into a plastic bag, the air removed therefrom by vacuum to limited ozonization and the blind is Subjected to 5,000,000 units of radiation from a Cobalt 60 irradiator to effect cross-linking of the polyethylene.

EXAMPLE 2

A transparent sheet of polyethylene terephthalate 12 microns thick is covered with a layer of aluminium having a thickness sufficient to make it completely opaque said layer being deposited using a vaporizing process in vacuum.

Said sheet is passed over a first glue applying set of rollers of a laminating machine and passed through a 6 meter oven thereof at a temperature of 120°. At the outlet of the oven, a second set of laminating rollers is adjusted to a speed of 120 m/min while the aforementioned glue applying rollers are adjusted to a slower speed to create a 6% stretch along the sheet between the two sets of rollers.

A second sheet of polyethylene terephthalate 50 microns thick is also fed to said laminating rollers wherein said first stretched sheet and said second sheet are glued and laminated to each other to form a composite sheet. Said composite sheet is spontaneously self-rolling and in order to assure that this inherent property of spontaneous rolling up is retained even after prolonged exposure to sunlight and heat the rolled up sheet is heated in an oven at 190° C. for 20 minutes to soften said second sheet and tighten the rolled effect of said composite sheet.

The sheet is then cut into smaller sheets measuring 45 by 60 cm, two such smaller sheets are superposed and one edge of a first sheet is heat welded to an aligned edge of a second sheet.

The joined sheets spontaneously concentrically roll up upon themselves with said welded end serving substantially as the axis around which said sheets roll up.

EXAMPLE 3

The procedure of example 2 was repeated, however, instead of using a transparent sheet of polyethyelene terephthalate covered with aluminum, a polyethylene sheet having gray pigment already incorporated therein was used. A product similar to example 2 was produced.

EXAMPLE 4

A transparent sheet of polypropylene 50 microns thick is covered with a layer of aluminium having a thickness sufficient to allow only light transmission therethrough said layer being deposited using a vaporizing process in vacuum.

A second sheet of nylon 12 microns thick is stretched 10% in an oven of a laminating machine at 140° C. and then glued to the aluminized side of said polypropylene sheet in said laminating machine to form a composite sheet.

Said composite sheet is rolled and then heated in an oven at 50° C. for 30 minutes to soften said polypropylene sheet and thereby tighten and strengthen the self-rolling property of the sheet.

EXAMPLE 5

A transparent sheet of polyetheylene terephthalate 12 microns thick is covered with a layer of aluminium having a thickness sufficient to make it completely opaque said layer being-deposited using a vaporizing process in vacuum.

Said sheet is passed over a first glue applying set of rollers of a laminating machine and passed through a 6 meter oven thereof at a temperature of 120°. At the outlet of the oven, a second set of laminating rollers is adjusted to a speed of 120 m/min while the forementioned glue applying rollers are adjusted to a slower speed to create a 6% stretch along the sheet between the two sets of rollers, A second sheet of 80 gram white paper is also fed to said laminating rollers wherein said first stretched sheet and said second sheet are glued and laminated to each other to form a composite sheet, said composite sheet is self-rolling and in order to assure that this inherent property of spontaneous rolling up is retained even after prolonged exposure to sunlight and heat the rolled up sheet is placed in a steam chamber for 30 minutes to soften said second sheet and tighten the rolled effect of said composite sheet.

The sheet is then cut into smaller sheets measuring 45 by 60 cm, two such smaller sheets are superposed and one edge of a first sheet is heat welded to an aligned edge of a second sheet.

The joined sheets spontaneously concentrically roll up upon themselves with said welded end serving substantially as the axis around which said sheets roll up.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A multilayer, self-rollable sheet, comprising a layer of paper joined to at least a first layer of stretched, laminatable plastic material, said sheet being capable of spontaneously alternating between a relaxed and a tensioned state and pre-treated, by heating and stretching in a range of about 4 to 15% in the longitudinal direction, to inherently assume a rolled-up configuration around an axis in said relaxed state as a result of the lamination of one stretched layer and one unstretched layer, and being further pre-treated, by irradiation, heating or exposure to moisture, to retain said spontaneous self-rolling capability.

2. The multi-layer, self-rollable sheet of claim 1, wherein
the laminatable plastic material is selected from the group consisting of polyethylene, polyethylene terephthalate, polypropylene, polyester and nylon.

3. The multi-layer, self-rollable sheet of claim 2, wherein the plastic laminatable material comprises polyethylene.

4. The multi-layer, self-rollable sheet of claim 1, further comprising
a second layer of laminatable plastic material joined to the paper layer on the side thereof opposite the first layer of plastic.

5. A multilayer, self-rollable sheet, comprising a layer of paper joined to at least a first layer of stretched, laminatable plastic material, said sheet being capable of spontaneously alternating between a relaxed and a tensioned state and pre-treated to inherently assume a rolled-up configuration around an axis in said relaxed state as a result of the lamination of one stretched layer and one unstretched layer, and being further pretreated to retain said spontaneous self-rolling capability, the sheet being prepared by a method comprising
a) heating and stretching in a range of about 4 to 15% in the longitudinal direction a sheet of plastic material;
b) laminating the stretched plastic sheet to a sheet of paper to form a self-rollable composite sheet which will roll-up along the direction of stretch of the plastic sheet, and assume said relaxed state;
c) allowing the composite sheet to roll onto itself;
d) then steam-heating the composite sheet to soften the paper sheet and tighten and strengthen the self-rolling effect upon cooling the composite sheet; and
e) cooling the heated composite sheet.

6. A multilayer, self-rollable sheet, comprising a layer of paper, a first side of the paper layer being joined to at least a first layer of stretched, laminatable plastic material, and a second side of the paper layer being joined to at least a second layer of laminatable plastic material, said sheet being capable of spontaneously alternating between a relaxed and a tensioned state and pre-treated to inherently assume a rolled-up configuration around an axis in said relaxed state as a result of the lamination of the first stretched layer, the paper layer, and the second unstretched plastic layer, and the sheet being further pre-treated to retain said spontaneous, self-rolling capability, comprising the sheet of claim 26, being further treated by
f) placing the composite sheet in the tensioned state;
g) laminating a second sheet of plastic material to the paper layer of the tensioned composite sheet; and
h) allowing the double-laminated composite sheet to roll onto itself.

7. A multilayer, self-rollable sheet, comprising a layer of paper, a first side of the paper layer being joined to at least a first layer of stretched, laminatable plastic material, and a second side of the paper layer being joined to at least a second layer of laminatable plastic material, said sheet being capable of spontaneously alternating between a relaxed and a tensioned state and pre-treated to inherently assume a rolled-up configuration around an axis in said relaxed state as a result of the lamination of the first stretched layer, the paper layer, and the second unstretched plastic layer, and the double-laminated sheet being further pre-treated by heating to retain said spontaneous, self-rolling capability, the double-laminated sheet comprising the sheet of claim 6, being further treated by
i) heating the rolled-up, double-laminated composite sheet to effect cross-linking of the polymer material, to soften the second plastic sheet and to tighten and strengthen the self-rolling effect upon cooling the double-laminated composite sheet; and j) cooling the heated, double-laminated composite sheet.

8. A multilayer, self-rollable sheet, comprising a layer of paper, a first side of the paper layer being joined to at least a first layer of stretched, laminatable plastic material, a second side of the paper layer being joined to at least a second layer of laminatable plastic material, said sheet being capable of spontaneously alternating between a relaxed and a tensioned state and pre-treated to inherently assume a rolled-up configuration around an axis in said relaxed state as a result of the lamination of the first stretched layer, the paper layer, and the second unstretched plastic layer, and the double-laminated sheet being further pre-treated by irradiation to retain said spontaneous, self-rolling capability, the double-laminated sheet comprising the sheet of claim 31 being further treated by i) subjecting the rolled-up, double-laminated composite sheet to irradiation to effect crosslinking of the plastic material, soften the second plastic sheet and tighten and strengthen the self-rolling effect upon cooling the double-laminated composite sheet; and j) cooling the irradiated, double-laminated composite sheet.

9. The multilayer self-rollable sheet of claim 8, wherein the radiation applied to the rolled-up, double laminated composite sheet comprises Cobalt 60 radiation.

10. The multilayer self-rollable sheet of claim 5, wherein the laminatable plastic material is selected from the group consisting of polyethylene, polyethylene terephthalate, polypropylene, polyester and nylon.

11. The multilayer self-rollable sheet of claim 10, wherein the laminatable plastic material is polyethylene.

12. The multilayer self-rollable sheet of claim 5, wherein the sheet of plastic material is stretched at a temperature of about 100° to 200° C.

13. The multilayer self-rollable sheet of claim 5, wherein the plastic sheet is passed through an oven maintained at the stretching temperature at a rate of about 80 to 120 m/min.

14. The multilayer self-rollable sheet of claim 5, wherein the plastic sheet is glued prior to stretching, and the glued, pre-stretched plastic sheet is laminated to the paper sheet.

* * * * *